United States Patent
Satoh

(10) Patent No.: US 8,180,502 B2
(45) Date of Patent: May 15, 2012

(54) APPARATUS AND PROGRAM FOR NAVIGATION

(75) Inventor: Taichi Satoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 836 days.

(21) Appl. No.: 12/219,842

(22) Filed: Jul. 29, 2008

(65) Prior Publication Data

US 2009/0043500 A1 Feb. 12, 2009

(30) Foreign Application Priority Data

Jul. 31, 2007 (JP) ................................. 2007-199266
Jul. 16, 2008 (JP) ................................. 2008-185105

(51) Int. Cl.
G05D 1/00 (2006.01)
(52) U.S. Cl. ............................................... 701/1; 702/3
(58) Field of Classification Search .................. 701/2, 1; 702/3; 707/9
See application file for complete search history.

(56) References Cited

U.S. PATENT DOCUMENTS

| | | | | |
|---|---|---|---|---|
| 2004/0181340 A1* | 9/2004 | Smith | | 702/3 |
| 2006/0241865 A1* | 10/2006 | Smith | | 702/3 |
| 2007/0049260 A1* | 3/2007 | Yuhara et al. | | 455/414.3 |
| 2007/0083328 A1* | 4/2007 | Suzuki | | 702/3 |
| 2007/0094262 A1* | 4/2007 | Suzuki et al. | | 707/9 |
| 2011/0066304 A1* | 3/2011 | Taylor | | 701/2 |

FOREIGN PATENT DOCUMENTS

| | | |
|---|---|---|
| JP | A-07-105491 | 4/1995 |
| JP | A-08-101040 | 4/1996 |
| JP | A-10-307042 | 11/1998 |
| JP | A-2000-193469 | 7/2000 |
| JP | A-2000-258174 | 9/2000 |
| JP | A-2001-110000 | 4/2001 |
| JP | A-2002-131064 | 5/2002 |
| JP | A-2003-004465 | 1/2003 |
| JP | A-2005-181272 | 7/2005 |
| JP | A-2006-084250 | 3/2006 |
| JP | A-2007-163442 | 6/2007 |

OTHER PUBLICATIONS

Notification of Reason(s) for Rejection issued from the Japanese Patent Office on Aug. 6, 2009 in the corresponding Japanese patent application No. 2008-185105 (and English translation).

* cited by examiner

*Primary Examiner* — Mark Hellner
(74) *Attorney, Agent, or Firm* — Posz Law Group, PLC

(57) ABSTRACT

A navigation apparatus defines a detection area for detecting a weather phenomenon as a predetermined range around a travel route that is designated as an area setting object. By referring to weather information acquired from external sources through communication, whether or not a weather warning exists in the detection area is determined. If the determination is affirmative, the weather phenomenon is considered as influential in the detection area, and the detection result is provided for a user. More practically, the travel route, the detection area and an affecting area of the weather warning are displayed on a display unit.

20 Claims, 15 Drawing Sheets

FIG. 2A

| INFO | DESCRIPTION |
|---|---|
| CURRENT ROAD CONDITIONS | FLOODED／SLIPPERY／PATCH ICE／ICE／SNOW／HEAVY SNOW／NO DATA |
| CURRENT WEATHER CONDITIONS | CLEAR／PARTLY CLOUDY／MOSTLY CLOUDY／CLOUDY／LIGHT RAIN／FOG／HEAVY FOG／MODERATE RAIN／HEAVY RAIN／FREEZING RAIN／HEAVY FREEZING RAIN OR ICE／SNOW／HEAVY SNOW／NO DATA |
| LIGHTNING | LIGHTNING CONDITION (OBSERVED／NOT) |
| HIGH WINDS | HIGH WIND CONDITION (OBSERVED／NOT) |
| MAJOR ROAD CLOSED | MAJOR ROAD CLOSE CONDITION (OBSERVED／NOT) |
| HAIL STORM (IN 5 TO 15 MIN) | HAIL STORM CONDITION (OBSERVED／NOT) |
| HAIL STORM (NOW OR WITHIN 5 MIN) | HAIL STORM CONDITION (OBSERVED／NOT) |
| SHEAR STORM (IN 5 TO 15 MIN) | SHEAR STORM CONDITION (OBSERVED／NOT) |
| SHEAR STORM (NOW OR WITHIN 5 MIN) | SHEAR STORM CONDITION (OBSERVED／NOT) |

FIG. 2B

| INFO | DESCRIPTION |
|---|---|
| NWS WARNING | WARNINGS SUCH AS TORNADO／STORM／FLOOD |
| STORM (IN 15 TO 25 MIN) | STORM CONDITION (OBSERVED／NOT) |
| VISIBILITY／FOG | GOOD／PATCHY／MARGINAL／VERY POOR |
| WIND | NONE OR LOW／MODERATE／HEAVY OR DANGEROUS |
| 30MIN FORECAST | NO PRECIPITATION／RAIN／MIXED／SNOW |

FIG. 3

| TYPE |
|---|
| <TORNADO CATEGORY> |
| TORNADO WATCH |
| TORNADO |
| <HURRICANE CATEGORY> |
| INLAND HURRICANE WIND |
| HURRICANE FORCE WIND |
| HURRICANE |
| TYPHOON |
| <STORM CATEGORY> |
| SEVERE THUNDERSTORM WATCH |
| SEVERE THUNDERSTORM |
| STORM |
| TROP CAL STORM |
| INLAND TROP CAL STORM |
| DUST STORM |
| <FLOOD CATEGORY> |
| FLOOD WATCH |
| FLASH FLOOD |
| COASTAL FLOOD |

| TYPE |
|---|
| LAKE SHORE FLOOD |
| HIGH SURF |
| FLOOD |
| <WINTER CATEGORY> |
| WINTER WATCH |
| HEAVY SNOW |
| HEAVY SLEET |
| LAKE EFFECT SNOW |
| FREEZE |
| HEAVY FREEZING SPRAY |
| BLIZZARD |
| ICE STORM |
| WINTER STORM |
| <WIND CATEGORY> |
| WIND WATCH |
| HIGH WIND |
| WIND CHILL |
| GALE |
| <EXTREMES CATEGORY> |

| TYPE |
|---|
| EXCESSIVE HEAT |
| <OTHER CATEGORY> |
| OTHER WATCH |
| RED FLAG |
| TSUNAMI |
| AVALANCHE |
| SPECIAL MARINE |
| EARTHQUAKE |
| LAW ENFORCEMENT |
| HAZARDOUS MATERIALS |
| NUCLEAR POWER PLANT |
| RADIOLOGICAL HAZARD |
| CIVIL DANGER |
| FIRE |
| SHELTER IN PLACE |
| VOLCANO |
| OTHER |

WARNING IS DISPLAYED ON SCREEN,
AND IS VOICE-GUIDED

FIG. 7A 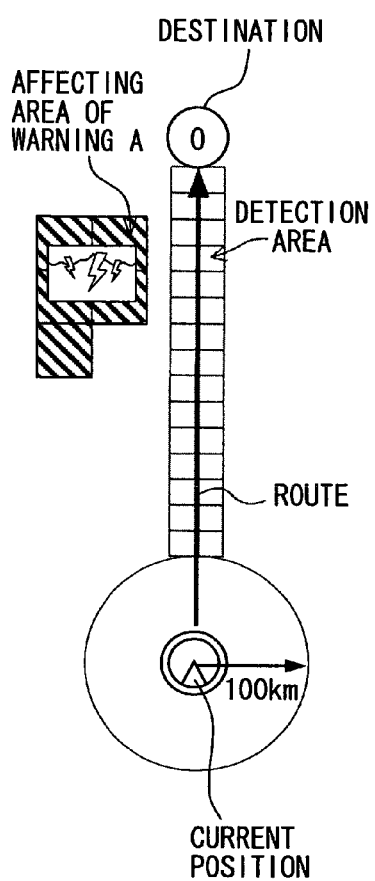 FIG. 7B 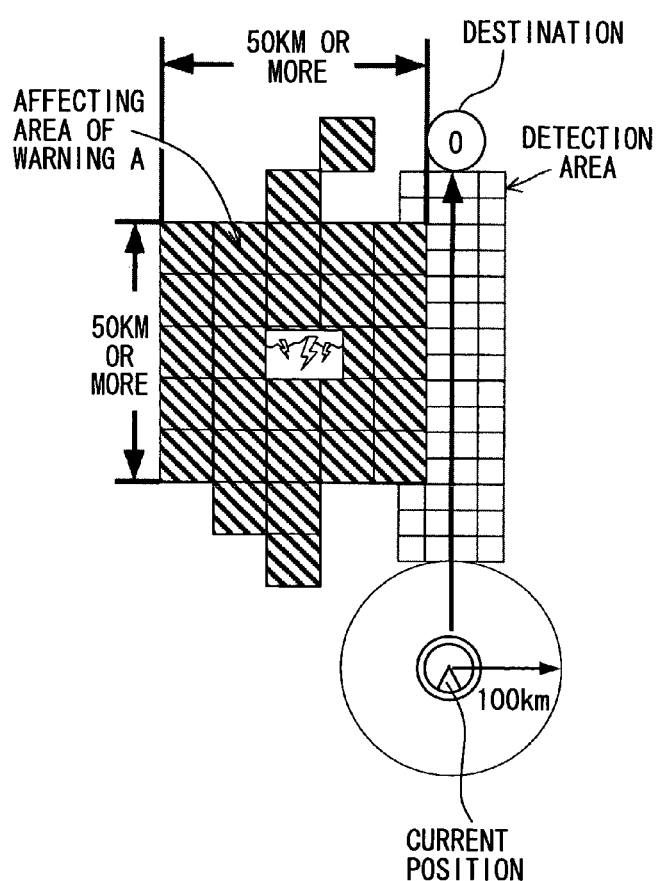
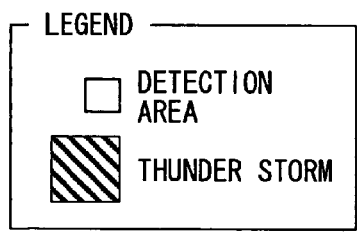

FIG. 8A
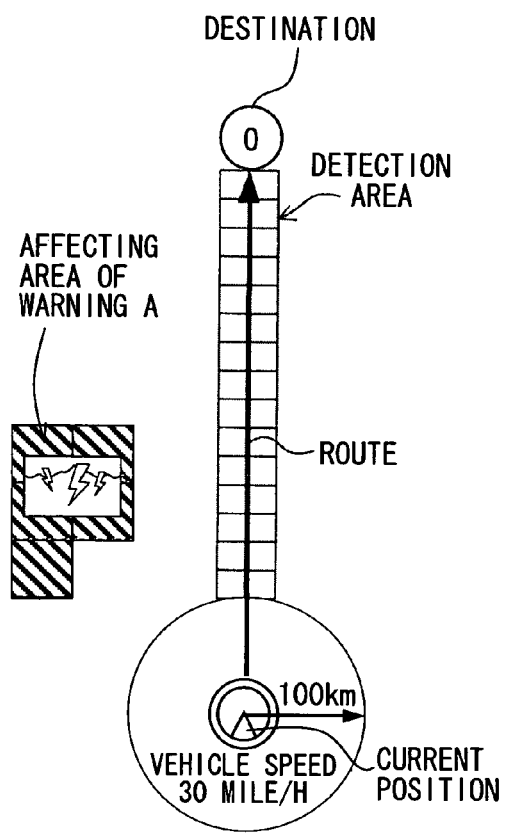
FIG. 8B
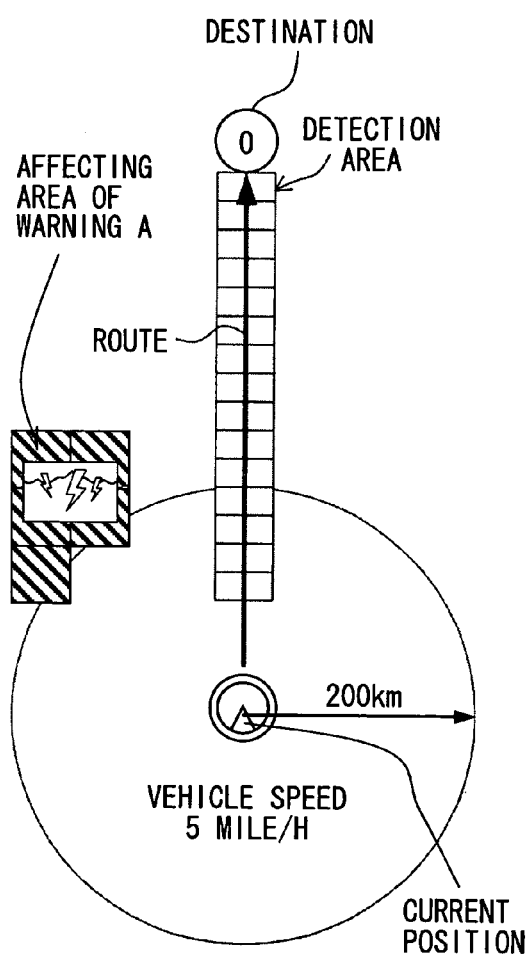
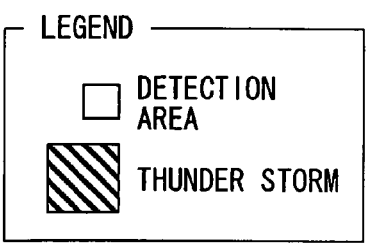

APPARATUS AND PROGRAM FOR NAVIGATION

CROSS REFERENCE TO RELATED APPLICATION

This application is based on and claims the benefit of priority of Japanese Patent Application No. 2007-199266 filed on Jul. 31, 2007 and Japanese Patent Application No. 2008-185105 filed on Jul. 16, 2008, the disclosure of which is incorporated herein by reference.

FIELD OF THE INVENTION

The present invention generally relates to a weather information detection method along a navigation route toward a destination of a travel in terms of detection accuracy and scope of influence for use in a vehicle.

BACKGROUND INFORMATION

Conventionally, navigation systems are used to search a route toward a travel destination and to provide a guidance of the searched route for a driver of a vehicle. In a navigation system, a position of the vehicle is detected and a map around the vehicle position is drawn on a display together with a vehicle position mark superposed thereon, and the map is scrolled on the screen for route guidance as the position of the vehicle is changed due to the travel of the vehicle.

Further, the navigation systems in recent years are equipped with communication functions to communicate with external servers and networks as well as reception functions to receive radio and TV broadcast and audio playback functions to play audio and/or video data on CD/DVD media or the like. Particularly, information of external events such as traffic congestions and/or accidents are available through the network, and update of map data for new roads and facilities are delivered from map distribution servers for an improved convenience of the user.

The communication functions are utilized for reception of weather information from the external sources, for displaying weather conditions and/or precipitation of a specific location based on the received weather information.

However, the navigation system described above is only capable of displaying the weather information acquired from the servers, and is not capable of presenting and drawing driver's attention to notices and warnings (typhoon information for example) in the traveling direction of the vehicle. Therefore, the driver of the vehicle has to check the weather notices and warnings after looking up the destination on the map when he/she uses the conventional navigation system.

A disclosure of Japanese Patent JP-A-2006-84250 describes a technique for displaying, for example, a weather forecast including a predicted course of a typhoon as inserted information on a display screen that is capable of displaying a roadmap when guidance points such as the travel destination and/or the current vehicle position are included in a typhoon influence area.

However, in the technique disclosed by above documents, a determination is made only to confirm whether or not the guidance points are included in the typhoon influence area. That is, in other words, the relation between the guidance route from the current position to the destination and a weather phenomenon such as a typhoon or the like is not taken into consideration. Therefore, the driver of the vehicle is still obliged to check the warnings after looking up the destination on the map even when he/she has the navigation system having the above guidance technique.

Further, the conventional navigation system is not capable of detecting the weather information in an actual condition even when the traffic information detection method for detecting the traffic information along the guidance route toward the destination is applied to the detection of the weather information due to the following reasons. That is, the traffic information regarding the traffic congestions, restriction on traffic lanes or the like is provided as an influence on the road, and the traffic information is determined as influential when the guidance route and the road under the influence of the traffic information is identical. On the other hand, the weather information such as rainstorm information should be considered as influential and should be reported for the driver of the vehicle even when the weather information being influential in a certain section in the grid of a weather information map is next to a section where the guidance route is passing, due to the nature of the weather information that cannot be clearly divided section to section in the grid map. However, the conventional traffic information detection method is not capable of suitably handling the weather information, that is, the conventional method cannot detect the influence of the weather information even in the next section of the grid map, thereby leading to an in-appropriate report of the weather information that does not reflect the actual condition of the reporting area.

SUMMARY OF THE INVENTION

In view of the above and other problems, the present disclosure provides a technique for accurately detecting weather information along a route from a current position toward a destination of a travel in an actual-condition reflecting manner.

An aspect of the navigation apparatus of the present invention includes: a travel route determination unit for determining a travel route of a vehicle; a detection area defining unit for defining a detection area; a weather information obtaining unit for obtaining weather information that is set to a first sectional unit on a map; and a determination unit for deciding whether or not an affecting area is at least partially existing in the detection area defined by the detection area defining unit with reference to the weather information. The navigation apparatus defines the detection area as an area that is within a predetermined range from the travel route determined by the travel route determination unit, and whether or not noteworthy weather phenomenon in the detection area affects the vehicle is detected. The travel route includes, for example, a route from a current vehicle position to a destination of travel and a currently traveling road (e.g., a current road). Further, the affecting area is made up of the first sectional unit to which the noteworthy weather phenomenon is set, and the determination unit determines that the weather phenomenon corresponding to the affecting area is affecting when the affecting area at least partially exists in the detection area.

The affecting area of the weather phenomenon is considered as existing in the detection area when a point on a periphery of the affecting area exists on a periphery of the detection area.

Therefore, by having the detection area described above, the weather information along the route toward the destination is accurately detected in an actual-condition reflecting manner.

Further, the above aspect of the present invention can also be realized as a program of a computer.

That is, a program of a computer provides a detection area defining unit a determination unit, and other units of the above navigation apparatus as a functional unit of the computer that is executed on the computer. The program for providing those functional units of the program may be, for example, provided as a record on a storage medium such as a CD-ROM, a DVD-ROM, an magneto-optical disk, a hard disk, a ROM, a RAM, or the like to be loaded on the computer for actually providing functions.

BRIEF DESCRIPTION OF THE DRAWINGS

Other objects, features and advantages of the present invention will become more apparent from the following detailed description made with reference to the accompanying drawings, in which:

FIG. 2A shows a table of a detailed description of weather information types and contents;

FIG. 2B shows a table of a detailed description of weather warnings in the weather information;

FIG. 3 shows a table of weather warnings types in the weather information;

FIGS. 7A/B show two other diagrams explaining weather information display processing;

FIGS. 8A/B show yet two other diagrams explaining weather information display processing;

DETAILED DESCRIPTION

Figure 1:
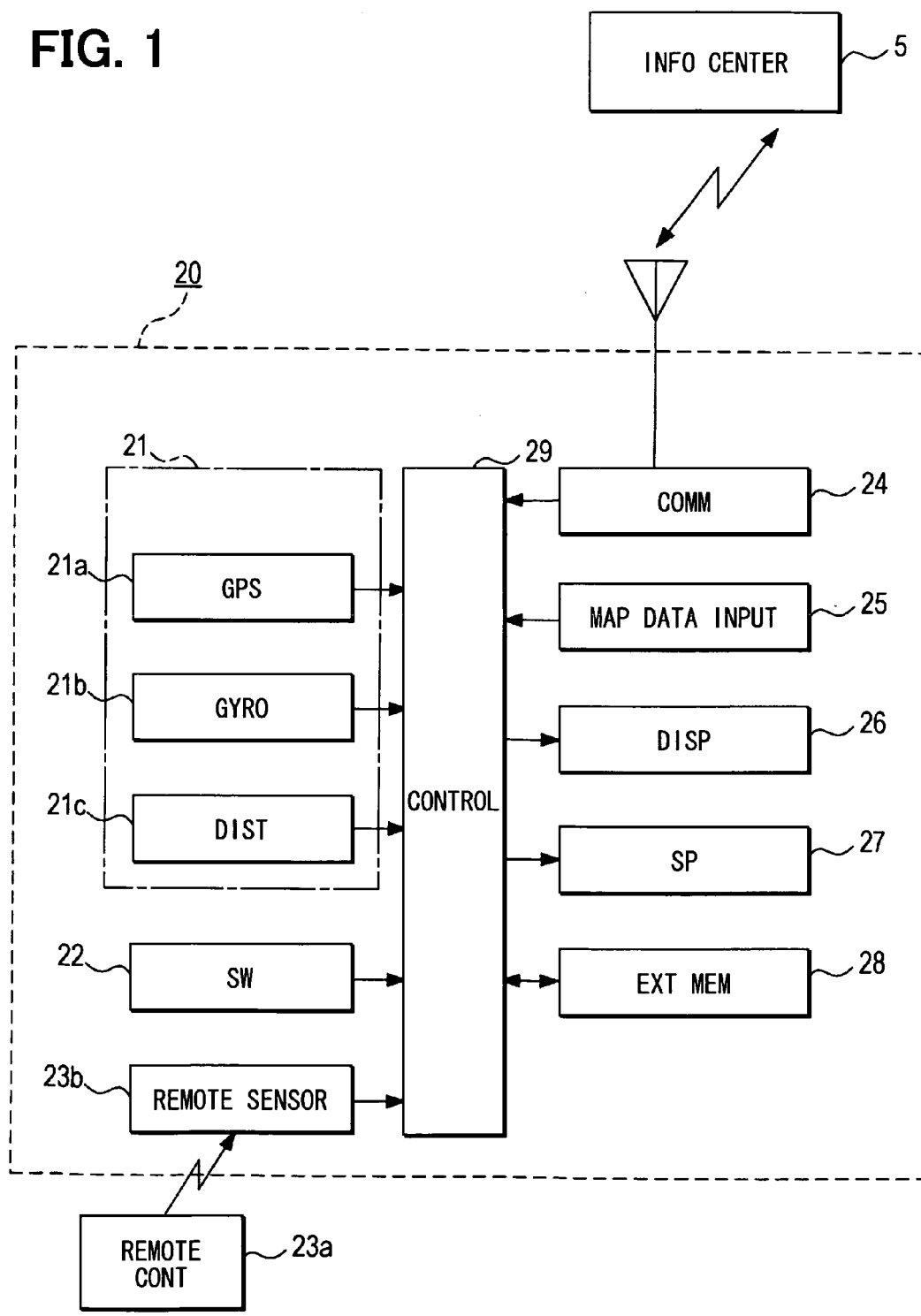
FIG. 1 shows a diagram showing an outline configuration of a navigation apparatus in a first embodiment of the present invention.

One embodiment form of the present invention is hereafter explained based on the drawing. FIG. 1 is a block diagram showing an outline configuration of a navigation apparatus 20.

(1. Explanation of the Configuration of Navigation Apparatus)

The navigation apparatus 20 includes a position detector 21 which is carried in vehicles and detects a position, a speed, a direction of movement, or the like of the vehicle, an operation switch group 22 for inputting various instructions from a user, a remote control terminal (designated as a remote controller hereafter) 23a for inputting various instructions as the switch group 22, a remote control sensor 23b which inputs a signal from the remote controller 23a, an external communication unit 24 which receives external information from an external information center 5, a map data input unit 25 which inputs map data etc. from an external record medium which stores map data and various kinds of information, a display 26 for performing various displays of a map display etc., and a speech output unit 27 for outputting various kinds of guide sounds or the like, an external memory 28 which memorizes a variety of information in a control circuit 29, and the control circuit 29.

The position detector 21 receives transmission signals from the artificial satellite of a Global Positioning System (GPS) through a GPS antenna by using a GPS receiver 21a which detects the position, speed, direction of movement etc. of the vehicle, a gyroscope 21b which detects the size of the rotational movement applied to the vehicle, and a distance sensor 21c which detects a travel distance of the vehicle. Since each of these sensors 21a-21c has an error of different nature, they are constituted to be used in a mutually compensating manner. In addition, only some of the above sensors may be used to constitute the position detector 21, or other sensors such as a steering rotation sensor and/or tire sensors may additionally be utilized depending on the required detection accuracy.

The operation switch group 22 is made from a touch panel integrally formed on the display 26 and mechanical key switches that are disposed on a circumference of the display 26. The touch panel is integrally layered on the display 26, and may use any of various kinds of sensing systems such as a pressure-sensitive system, an electromagnetic induction system, an electric capacity system, or a system that combines some of these systems.

The external communication unit 24 receives weather information distributed by an FM multiplex broadcast, satellite broadcasting, radio waves, optical beacons, or the like from the information center 5. The weather information may be received through telephone line networks, such as the Internet or the like from the information center 5.

In addition, the external communication unit 24 corresponds to a weather information obtaining unit in claiming language.

The map data input unit 25 is an equipment for inputting the various data memorized by the map data storage media (for example, a hard disk, a DVD-ROM, etc.) which are not illustrated. The map data (node data, link data, cost data, background data, road data, name data, mark data, crossing data, facility data, etc.) as map information, the voice data for guidance, speech recognition data, etc. are memorized by the map data storage medium. In addition, these data may be inputted through a communication network instead of inputting these data from the map data storage medium.

A display 26 is a colored presentation device, and may be composed of a device such as a liquid crystal display, a plasma display, a CRT, or the like. A display screen of the display 26 displays a mark which shows a current location of the vehicle according to a position detected by the position detector 21 and a specified map based on the map data inputted from the map data input unit 25. The display screen also displays, in addition to the mark of the current location, a guidance route to the destination, as well as additional data such as a location name, a landmark, various facilities, and the like being superposed on top of the current position mark. Further, as described later, a section of the map having the weather information set up in accordance to each of predetermined sectional units may be displayed in a different display mode so that the section can be distinguished from other sections of the map (refer to FIGS. 5 and 6).

In addition, the display 26 corresponds to a display unit.

The speech output unit 27 can output the sound of various guidance of travel route guidance or the like.

The control circuit 29 includes a well-known microcomputer which has a bus line or the like for interconnecting a CPU, ROM, RAM, I/O, and other components. Various processing is performed in the circuit 29 according to the input from the position detector 21, the operation switch group 22, the remote control sensor 23*b*, the external communication unit 24, and the map data input unit 25 as mentioned above, and, according to the processing, the external communication unit 24, a display 26, and the speech output unit 27 are controlled. The control circuit 29 performs various processing by using the data stored in the external memory 28 according to the program memorized by the ROM or the like.

For example, as navigation-related processing, map display processing, routing assistance processing, and the like are considered. Map display processing is a processing which displays on the display 26 the map around the current position or the like that is read from the map data input unit 25 by calculating the current vehicle position as a combination of coordinates and a travel direction based on each of the detection signals from the position detector 21. Further, routing assistance processing is a processing which computes the optimal route from a current position to the destination, and performs travel guidance for the computed route based on the point data stored in the map data input unit 25, and the destination being set up according to operation of the operation switch group 22, the remote controller 23*a*, etc. The technique for automatically setting up the optimal route includes a technique such as cost calculation by using the Dijkstra method, which is well known in the art.

Furthermore, the control circuit 29 also performs display processing of weather information in parallel to above-mentioned map display processing, routing assistance processing, etc. In addition, detailed explanation of the display processing is mentioned later. Further, the control circuit 29 corresponds to a travel route determination unit, a detection area defining unit, a determination unit, and a control unit.

The navigation apparatus 20 acquires the weather information from the information center 5 through the external communication unit 24 as mentioned above. Now, the explanation of the information center 5 is provided.

The information center 5 includes weather information database which accumulates the weather information for transmitting the information to the navigation apparatus 20, a circuit terminal unit which communicates through a communication line (both of the database and terminal unit not shown) as well as a server (not shown) which manages data.

Figure 5:
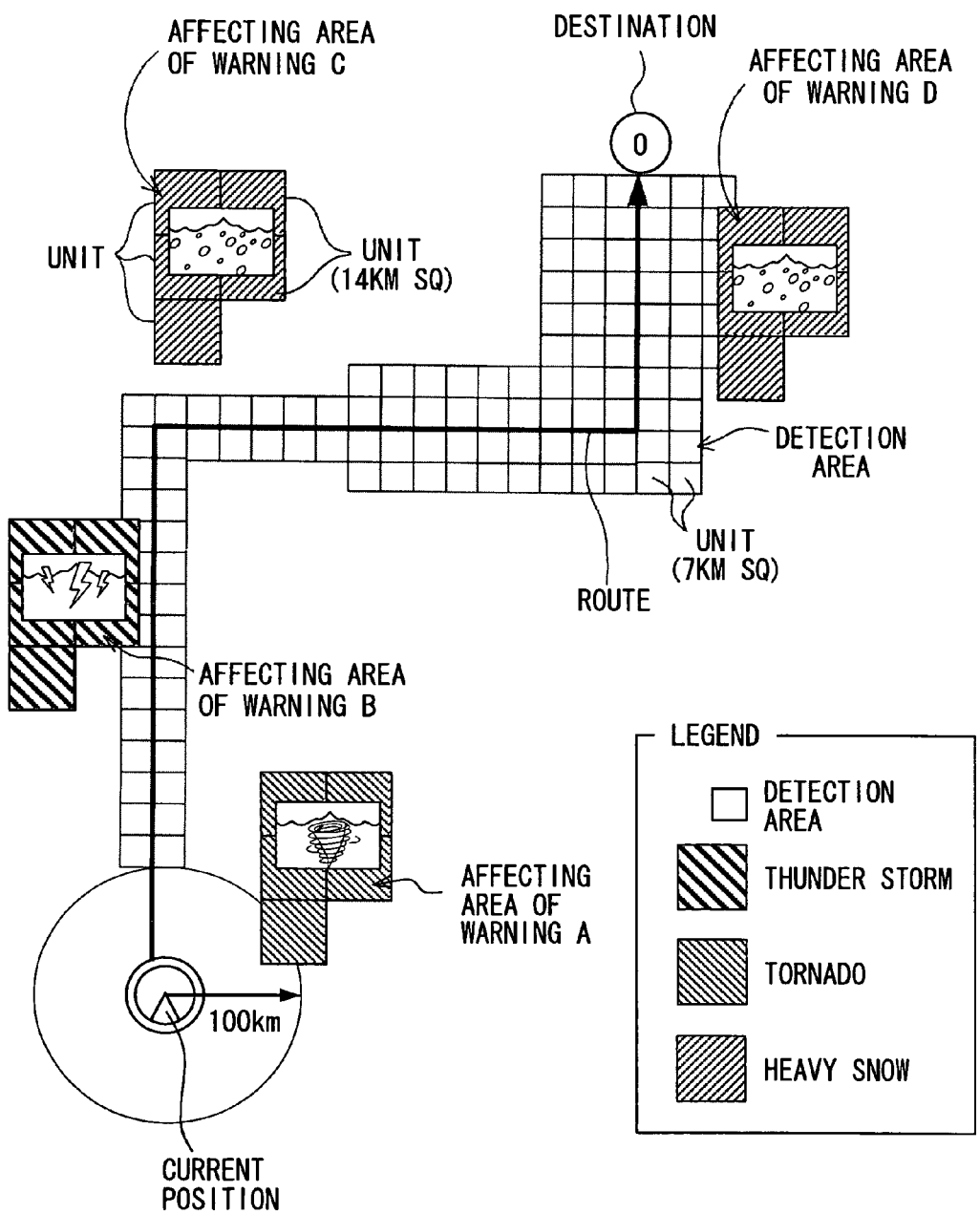
FIG. 5 shows a diagram explaining weather information display processing.
Figure 15:
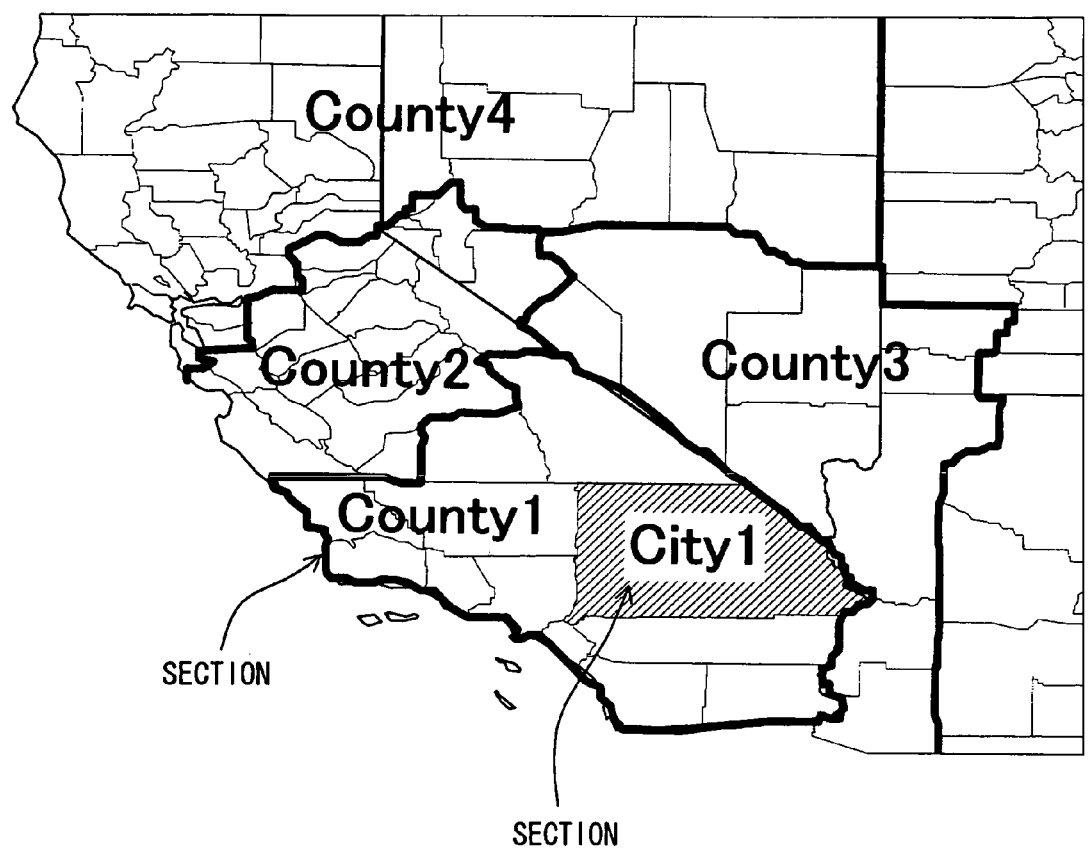
FIG. 15 shows a diagram showing an example of a section of the weather information.

The weather information database stores observation information on the weather, that is, accumulated weather information of the comparatively wide areas based on information from whether information providers and/or organizations. The weather information is accumulated corresponding to each of a predetermined sectional unit on the map (e.g., a first sectional unit in claiming language). The predetermined sectional unit may be, for example, a grid area divided by longitude and latitude lines, or a unit of administrative boundaries (cf. FIG. 15). In the present embodiment, the square division of the grid unit having a side element of 14 kilometers divided by latitude and longitude lines is used as the predetermined sectional unit as illustrated in FIG. 5. In addition, as a unit of division, a polygonal division unit which shows a form of areas such as a county, a city or the like may be used (refer to FIG. 15). Further, in FIG. 15, the county is represented as a figure surrounded by a thick line, and the city is represented as a figure surrounded by a fine line. Furthermore, in FIG. 15, hatching is used to highlight one of plural cities. Furthermore, the weather information accumulated in the database includes, as exemplified in FIG. 2A, present condition information and forecast information including fine weather, rainy weather, a thunder, a storm, etc., and, as shown in FIG. 2B, weather warnings including a tornado, a flood, etc. Moreover, as a classification (i.e., a kind, or a type) of a weather warning, there are a tornado, a thunderstorm, a typhoon, a rain, a fog, a sleet, a snow, a hail, etc. (refer to FIG. 3). In addition, the weather warning corresponds to "a weather phenomenon which is noteworthy" in claiming language.

(2. Explanation of Weather Information Display Processing)

Figure 4:
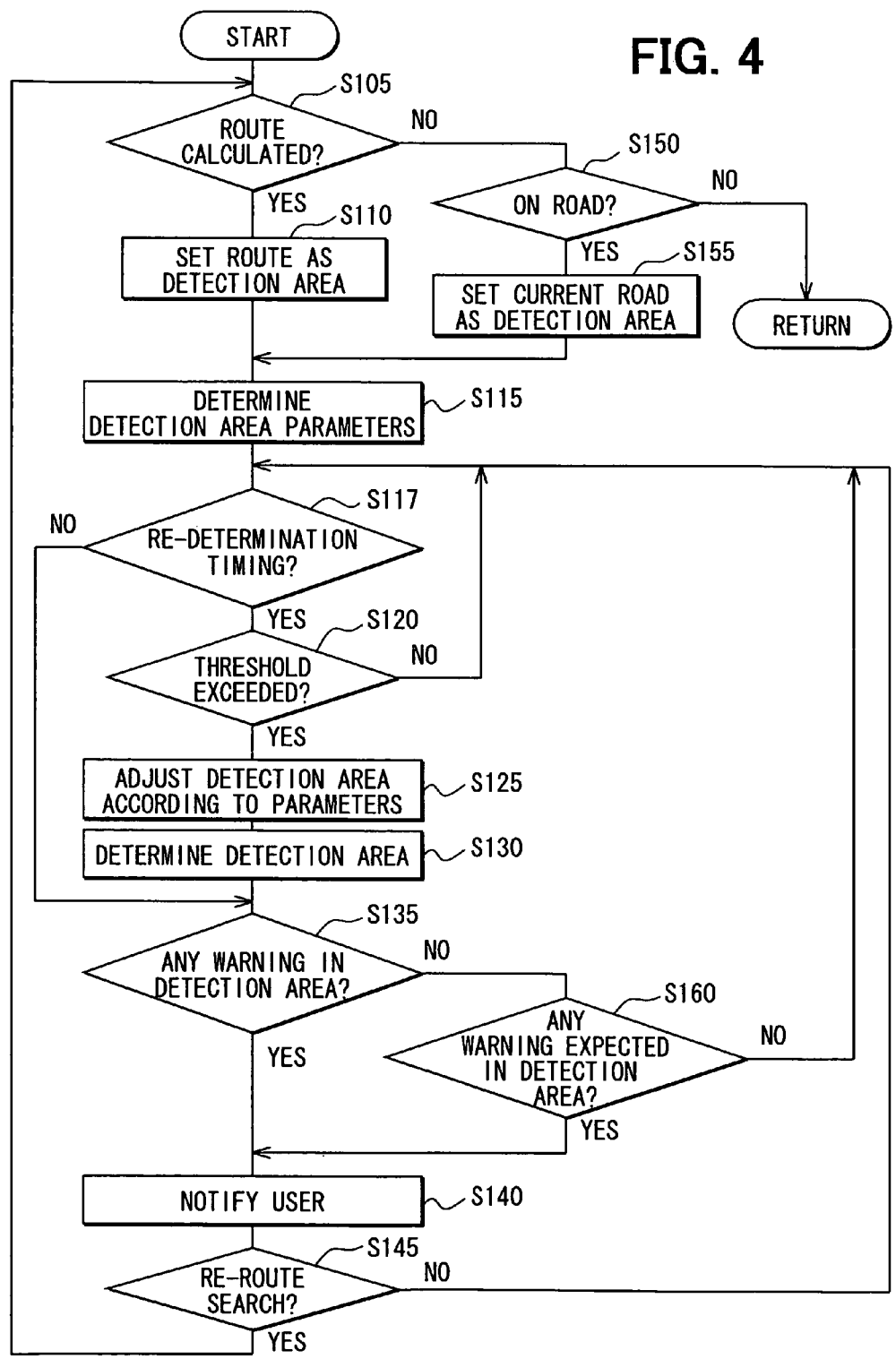
FIG. 4 shows a flow chart of weather information display processing performed by a control circuit of the navigation apparatus.

Next, the weather information display processing performed by the control circuit 29 of the navigation apparatus 20 is explained with reference to the flow charts of FIG. 4 and FIG. 5. In addition, FIG. 5 is an illustration explaining weather information display processing.

The processing in the control circuit 29 determines, first, whether the route calculated by the route calculation exists in a buffer (S105). In being a negative determination (S105: NO), the control circuit 29 determines whether the vehicle is located on a road (S150). If it is a negative determination (S150:NO) the processing returns to re-execute the present processing. On the other hand, in being an affirmative determination (S150:YES), based on the present location (a self-vehicle position), the direction of travel of the vehicle and the map data, the control circuit 29 considers the currently traveling road as an object of the detection area (S155), and the processing proceeds to S115. In addition, the detection area is defined as an area in which whether the noteworthy weather phenomenon is affecting is detected and determined. Further, the route calculated by the above-mentioned route calculation and the road where the vehicle is traveling are the travel route in claiming language.

Moreover, in S105 in the above description, in being an affirmative determination (S105:YES), the control circuit 29 sets the route as the object of setting up the detection area (S110), and the processing proceeds to S115. Then, the control circuit 29 defines, from among the objects of the setting up the detection area, a predetermined area as the detection area according to the following processing of S115-S130.

First, the control circuit 29 determines parameters for defining the detection area (S115). In this case, as an example of the parameters, the travel direction of the vehicle, the speed (or travel distance) of the vehicle, an expected arrival time, a type of weather information, whether the vehicle is on an arbitrary road (i.e., a currently traveling road) or on a guidance route, a road classification, or the like is considered. Moreover, among those parameters, there are parameters referred to when the detection area is determined. More practically, the parameters such as (1) a distance to an arbitrary point, (2) a travel time to an arbitrary point, (3) a range of weather information, (4) a travel speed of the vehicle, (5) a speed limit of the road, (6) a kind of weather information, (7) the existence of waypoints, (8) a kind of waypoints, (9) a route shape, and the like are considered. In addition, although each of the parameters for detection area determination is set as effective as a default setting, the setting of effective/not-effective may be chosen by user operation from the switch group 22. That is, the parameters having the effective setting are determined as the parameters for the detection area determination in S115. The following explanation explains the case where two parameters of (1) "a distance to an arbitrary point" and (2) "a travel time to an arbitrary point" are determined as the parameter for the detection area determination as an example. The case where the other parameters are determined as the parameter for the detection area determination is mentioned later.

Then, in order that the control circuit 29 may change the detection area periodically, whether it is the re-determination timing of the detection area is examined (S117). In addition, when the detection area has not yet determined in the currently traveling road or the guidance route that are set as the detection area setting objects, an affirmative determination shall be carried out at this step. As the re-determination timing, a timing of guidance route setting and re-setting, a timing of a current position update, a predetermined time interval, a timing of speed change, a timing of weather information update, a timing of road type change, a timing of waypoint increase/decrease and the like are included. That is, at least one of the above timings is used as the effective timing of the re-determination. Moreover, the re-determination timing common to all parameters may be used, or the re-determination timing peculiar to each of the parameters may be set up. When each of the parameters has its own re-determination timing and effective parameters are arbitrarily chosen, the re-determination timing of the chosen parameters may be used as effective timings besides the re-determination timing common to all parameters, or one of the re-determination timings of the chosen parameters or the re-determination timing common to all parameters may be selectively used as the effective re-determination timing. In addition, (1) "a distance to an arbitrary point" parameter may preferably have a timing of "a current position update" as its own peculiar re-determination timing, and (2) "a travel time to an arbitrary point" parameter may preferably have a timing of "a current position update" as its own peculiar re-determination timing.

In S117, the processing proceeds to S135 that is mentioned later when not all of the parameters determined as the detection area determination is coming to the re-determination timing (S117:NO). On the other hand, the control circuit 29 determines whether the threshold value for the detection area change is exceeded about the parameter for the detection area determination which is coming to the re-determination timing (S120) when the detection area has not yet determined in the currently traveling road or the guidance route that is set as the detection area setting object, or when at least one of the parameters determined as the detection area determination is coming to the re-definition timing (S117:YES). In addition, (1) the threshold value of the detection area change about the parameter "a distance to an arbitrary point" is defined as "the distance to an arbitrary point is greater than X mile," and (2) the threshold value of the detection area change about the parameter "a travel time to an arbitrary point" is defined as "the travel time to an arbitrary point is greater than X min." When the processing has an affirmative determination (S120: YES), a detection area is changed to be increased or decreased according to the parameter (S125). More practically, (1) when the threshold value of the detection area change regarding "the distance to an arbitrary point" is exceeded, the distance from the guidance route to an outer boundary is multiplied by a factor of n for an arbitrary section of the guidance route according to the distance from the current location to the arbitrary point. In an example, when the route—detection area outer boundary distance is determined as a preset distance (e.g., 7 kilometers) in a section of the route between the current position and a point on the route 10 miles ahead, the route—detection area outer boundary distance is multiplied by a factor of two for a section of the route between the 10 mile ahead point and the 30 mile ahead point, and the route—detection area outer boundary distance is multiplied by a factor of 4 for a section of the route between the 30 mile ahead point and the 50 mile ahead point. The reason for setting the route—detection area outer boundary distance in the above-described manner is that the weather phenomenon of highly possibly coming close to the route at a time when the vehicle reaches the arbitrary point ahead on the route should be detected by being included in the detection area. In addition, the detection area may be formed as an area having a smooth outer boundary by setting the interval between the arbitrary points to a smaller value. Further, by first determining the distance between each of the arbitrary points and the detection area outer boundary, the detection area may be set as an area that is defined by connecting the points on the outer boundary for each of the arbitrary points. More practically, when the distance from the arbitrary point to the outer boundary of the detection area is specifically determined as the predetermined distance (for example, 7 kilometers) at the point of 10 miles ahead, the distance from an arbitrary point to the outer boundary of the detection area is multiplied by a factor of two at the arbitrary point of 30 miles ahead, and the distance to from an arbitrary point to the outer boundary of the detection area is multiplied by a factor of 4 at the arbitrary point of 50 mile ahead. In this case, the detection area is formed as an area that is formed by connecting the outer boundary points of each of the arbitrary points ahead.

Further, (2) when the threshold value of the detection area change regarding the parameter of "the travel time to an arbitrary point" is exceeded, the distance from the route to the outer boundary of the detection area for a section of a route between the arbitrary points is multiplied by a factor of n according to the travel time to the arbitrary point. More practically, for example, when the distance from the route to the outer boundary is set to a preset value (for example, 7 kilometers) for a section of the route from the current position to the point to be reached in 30 minutes, the outer boundary distance is multiplied by a factor of two for the section of the route to be reached between 30 minutes and 45 minutes, and the outer boundary distance is multiplied by a factor of 4 for the section of the route to be reached between 45 minutes and 60 minutes. In this case, the detection area is defined by the travel time instead of the distance to the arbitrary points for detecting the weather phenomenon that comes close to the arbitrary point on the route at a time of arrival of the vehicle. In addition, in the case (2) of the parameter of "the travel time to an arbitrary point," the interval between the arbitrary points may have a smaller value for having a smoother outer boundary in the same manner as the case (1) of the parameter of "the distance to an arbitrary point," or by first determining the distance between each of the arbitrary points and the detection area outer boundary, the detection area may be set as an area that is defined by connecting the points on the outer boundary for each of the arbitrary points.

Then, the control circuit 29 determines the detection area at S130 (refer to FIG. 5). On the other hand, in being a negative determination (S120:NO), the processing returns to S117. In addition, the detection area is formed by a predetermined division unit on a map (equivalent to a second sectional unit in claiming language). Moreover, the detection area is formed by using a sectional unit of a square grid having a side of 7 kilometers divided by latitude and longitude. In addition, the unit of the detection area is set up to be smaller than the unit of the affecting area of the weather phenomenon. Further, about the detection area, the distance from the arbitrary point to the outer boundary is set to increase in a stepwise manner according to the distance from the current position to the arbitrary point. More practically, for example, whenever the route distance exceeds a predetermined value, the distance from the arbitrary point to the outer boundary is increased. In addition, the distance from an arbitrary point to the outer boundary may be defined by to the number of grids. Furthermore, the detection area is set up as an area within a predetermined distance from the current position of the vehicle. In the present embodiment, an area within 100 kilometers from the current position of the vehicle is included in a range of the detection area.

Then, the control circuit 29 determines whether a weather warning exists in the detection area with reference to the weather information which the external communication unit 24 has acquired (S135). With reference to the weather information, while the vehicle travels along the route, whether or not a part of "the affecting area" which is an area where the noteworthy weather phenomenon has an influence exists in the detection area in practice. In addition, an affirmative determination is performed when the arbitrary point on the outer boundary of the affecting area of the weather phenomenon is located on the outer boundary of the detection area. In being an affirmative determination (S135:YES), the control circuit 29 determines that the weather phenomenon has the influence, and notify the user of the determination result (S140). More practically, "the travel route" such as a currently traveling road or the like as well as "the detection area" and "the affecting area of the weather phenomenon" are displayed on the display 26. Then, the processing proceeds to S145.

On the other hand, in being a negative determination in S135 (S135:NO), the control circuit 29 determines whether it is expected that a weather warning occurs in the detection area (S160). In addition, the expected arrival time may be considered in the above determination. For example, the control circuit 29 determines it affirmatively when the arrival time of the vehicle to the detection area and the expected issuance time of the weather warning are same, and the affirmative determination is notified for the user. In being an affirmative determination (S160:YES), it is determined that the weather phenomenon is affecting, and the user is notified of the determination result (S140), and the processing proceeds to S145. On the other hand, in being a negative determination (S160:NO), the processing returns to S117.

Then, the control circuit 29 determines whether or not a re-search of the route is performed (S145). When the re-search is performed, for example, according to a diversion from the route or according to a user operation, or when a traffic condition is changed in the travel route during a dynamic route search, the processing determines it as an affirmative determination. In being an affirmative determination (S145:YES), the processing returns to S105. On the other hand, in being a negative determination (S145:NO), the processing returns to S117.

In the following, the case where parameters other than the following two cases, that is, (1) the parameter of "the distance to an arbitrary point" and (2) the parameter of "the travel time to an arbitrary point," are determined as parameters for the detection area determination is explained.

First, as the parameter (3) "a range of weather information," "the timing of weather information update" may preferably be set as the re-determination timing peculiar to the parameter. This parameter has the threshold value of detection area change defined as a condition "when the size of the affecting area of the weather phenomenon is greater than a radius of X mile." That is, when the threshold value for detection area change is exceeded, the distance to the outer boundary of the detection area is multiplied by a factor of n according to the size of the affecting area of the weather phenomenon. For example, when the affecting area of the weather phenomenon (a total of grids) is an area of 50 kilometers square as illustrated in FIGS. 7A/B, the distance from an arbitrary point to the outer boundary of the detection area is multiplied by a factor of 2. In addition, the arbitrary point is specified as follows. That is, whether the detection area of a guidance route exists within a predetermined distance (for example, 100 kilometers) from the affecting area of the weather phenomenon is determined for the weather phenomenon having the affecting area greater than the predetermined range, and, if the detection area exists within the predetermined distance, the arbitrary point is determined as a point that corresponds to a portion of the detection area existing within the predetermined distance. Further, when the direction-of-travel of the weather phenomenon is available as weather information, whether the detection area of a guidance route exists in the direction of travel of the affecting area of the weather phenomenon is determined, and, when it exists, the arbitrary point may be determined as a point that corresponds to the portion of the detection area existing in the travel direction of the affecting area. This scheme is adopted because the influence of the weather phenomenon is considered to be larger than usual when the coverage of the weather information is larger. That is, the detection area is expanded to cover the larger area for detecting the weather phenomenon further in advance.

Further, about the parameter (4) "a travel speed of the vehicle," "the timing of vehicle speed change" may preferably be set as the re-determination timing peculiar to the parameter. This parameter has the threshold value of continuation of the travel under the speed of X mile/h for a predetermined period for the detection area change. That is, when the threshold value for detection area change is exceeded, the distance to the outer boundary of the detection area is multiplied by a factor of n according to the travel speed of the vehicle. For example, when the travel speed of the vehicle is under 10 km/h for a period of 10 minutes as illustrated in FIGS. 8A/B, the distance from an arbitrary point to the outer boundary of the detection area is multiplied by a factor of 2. Further, when the travel speed of the vehicle is under 10 km/h for a period of additional 10 minutes, the distance from an arbitrary point to the outer boundary of the detection area is multiplied by a factor of 4. This scheme is adopted because the stay of the vehicle at a certain place tends to be extended when the travel speed of the vehicle is slow. That is, the detection area is expanded to cover the larger area for detecting the possibly affecting weather phenomenon further in advance.

Further, about the parameter (5) "a speed limit of the road," "the timing of classification change of the traveling road" may be preferably set as the re-determination timing peculiar to the parameter. This parameter has the threshold value of "when the speed limit of the road changes to X miles/h," for the detection area change. That is, when the threshold value for detection area change is exceeded, the distance from an arbitrary point to the outer boundary of the detection area is multiplied by a factor of n according to the speed limit of the road. For example, as illustrated in FIGS. 8A/B, when the vehicle enters a road with a speed limit of 10 miles/h, the distance from the current vehicle position to the outer boundary of the detection area is multiplied by a factor of 2. This scheme is adopted because the stay of the vehicle at a certain place tends to be extended when the speed limit of the road is low. That is, the detection area is expanded to cover the larger area for detecting the possibly affecting weather phenomenon further in advance.

Figure 9A:
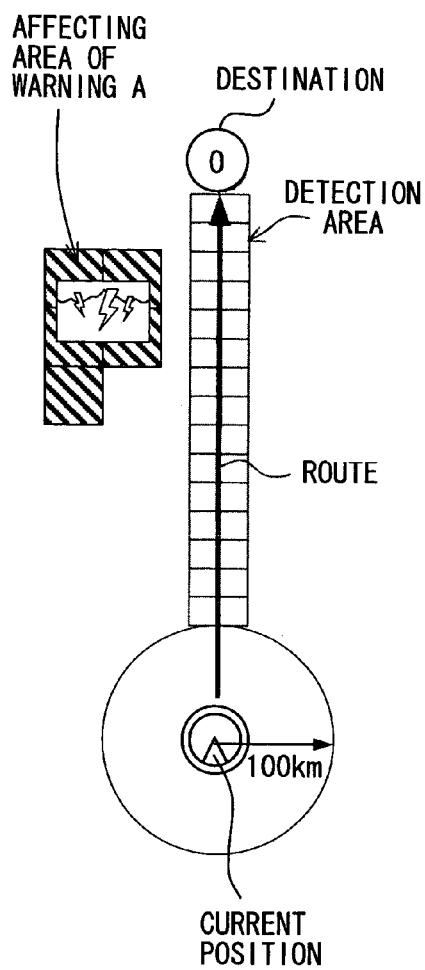
FIGS. 9A/B show still yet two other diagrams explaining weather information display processing.
Figure 9B:
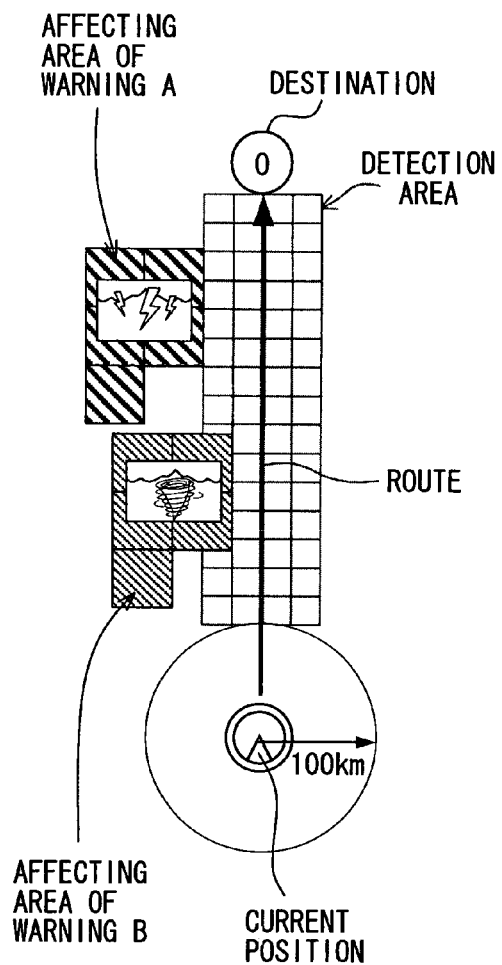

Further, about the parameter (6) "a kind of weather information," "the timing of weather information update" may be preferably set as the re-determination timing peculiar to the parameter. This parameter has the threshold value of "when specific weather information exists," for the detection area change. That is, when the threshold value of detection area change is exceeded, the distance from an arbitrary point to the outer boundary of the detection area is multiplied by a factor of n according to the classification of weather information. For example, as illustrated in FIGS. 9A/B, when a tornado exists, the distance from an arbitrary point to the outer boundary of the detection area is multiplied by a factor of 2. In addition, the arbitrary point is specified as follows. That is, whether the detection area of a guidance route exists within a predetermined distance (for example, 100 kilometers) from the affecting area of the weather phenomenon is determined when the classification of the weather phenomenon is a specific category, and, if the detection area exists within the predetermined distance, the arbitrary point is determined as a point that corresponds to a portion of the detection area existing within the predetermined distance. Further, when the direction-of-travel of the weather phenomenon is available as weather information, whether the detection area of a guidance route exists in the direction of travel of the affecting area of the weather phenomenon is determined, and, when it exists, the arbitrary point may be determined as a point that corresponds to the portion of the detection area existing in the travel direction of the affecting area. This scheme is adopted because the influence of the weather phenomenon is greater than usual when the classification of the weather phenomenon is considered to be unsafe for the travel of the vehicle. That is, the detection area is expanded to cover the larger area for detecting the weather phenomenon further in advance.

Figure 10:
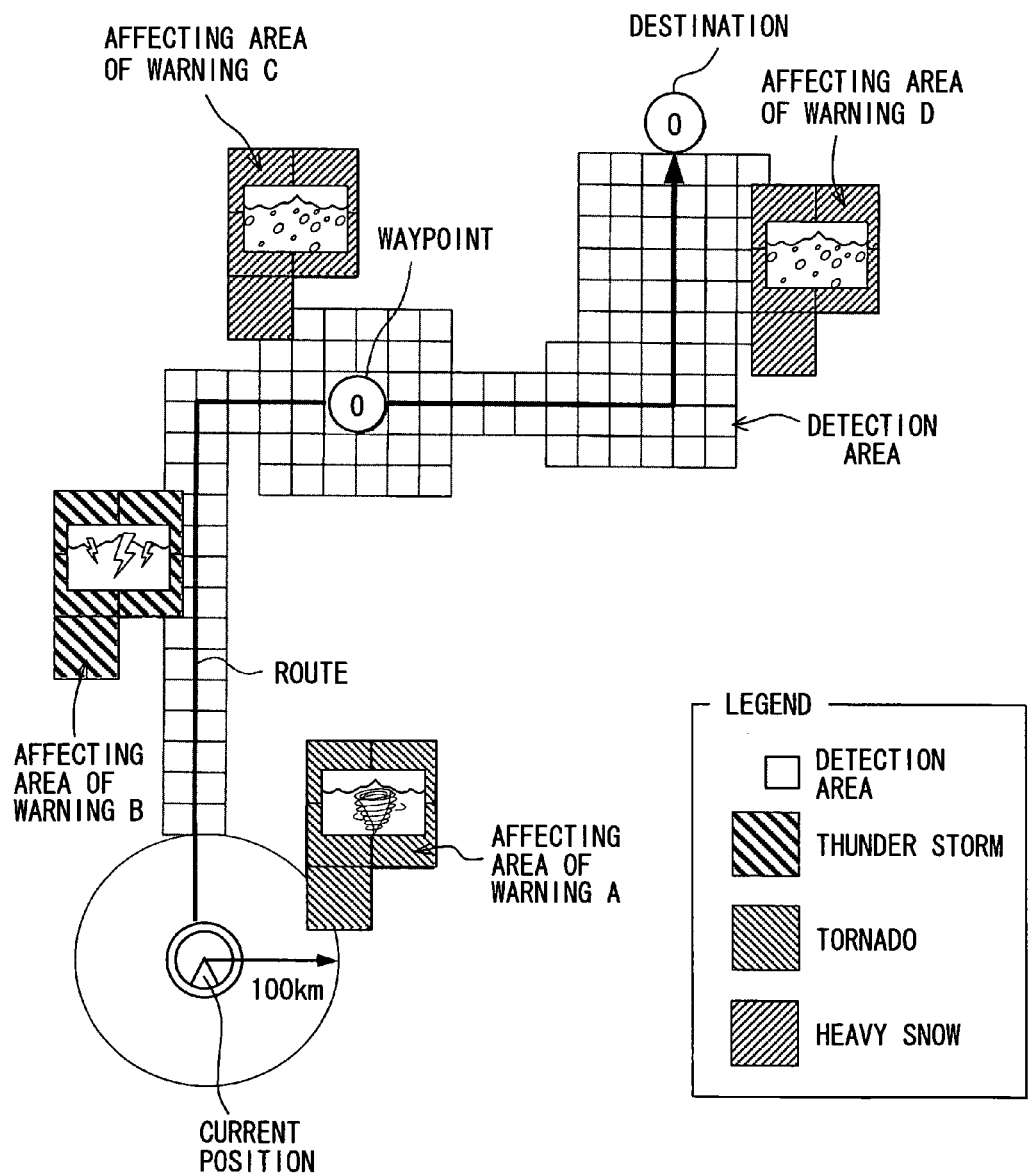
FIG. 10 shows still yet another diagram explaining weather information display processing.

Further, about the parameter (7) "existence of waypoints," "the timing of the change of the number of waypoints," or "the timing of route setting (including re-routing)" may be preferably set as the re-determination timing peculiar to the parameter. This parameter has the threshold value of "when there is a waypoint," for the detection area change. That is, when the threshold value of detection area change is exceeded, the distance from the waypoint to the outer boundary of the detection area is multiplied by a factor of n. For example, as illustrated in FIG. 10, when there is a waypoint, the distance from the waypoint to the outer boundary of the detection area is multiplied by a factor of 3. This scheme is adopted because the stay of the vehicle at a certain point tends to be extended when there is a waypoint. That is, the detection area is expanded to cover the larger area for detecting the weather phenomenon further in advance.

Figure 11:
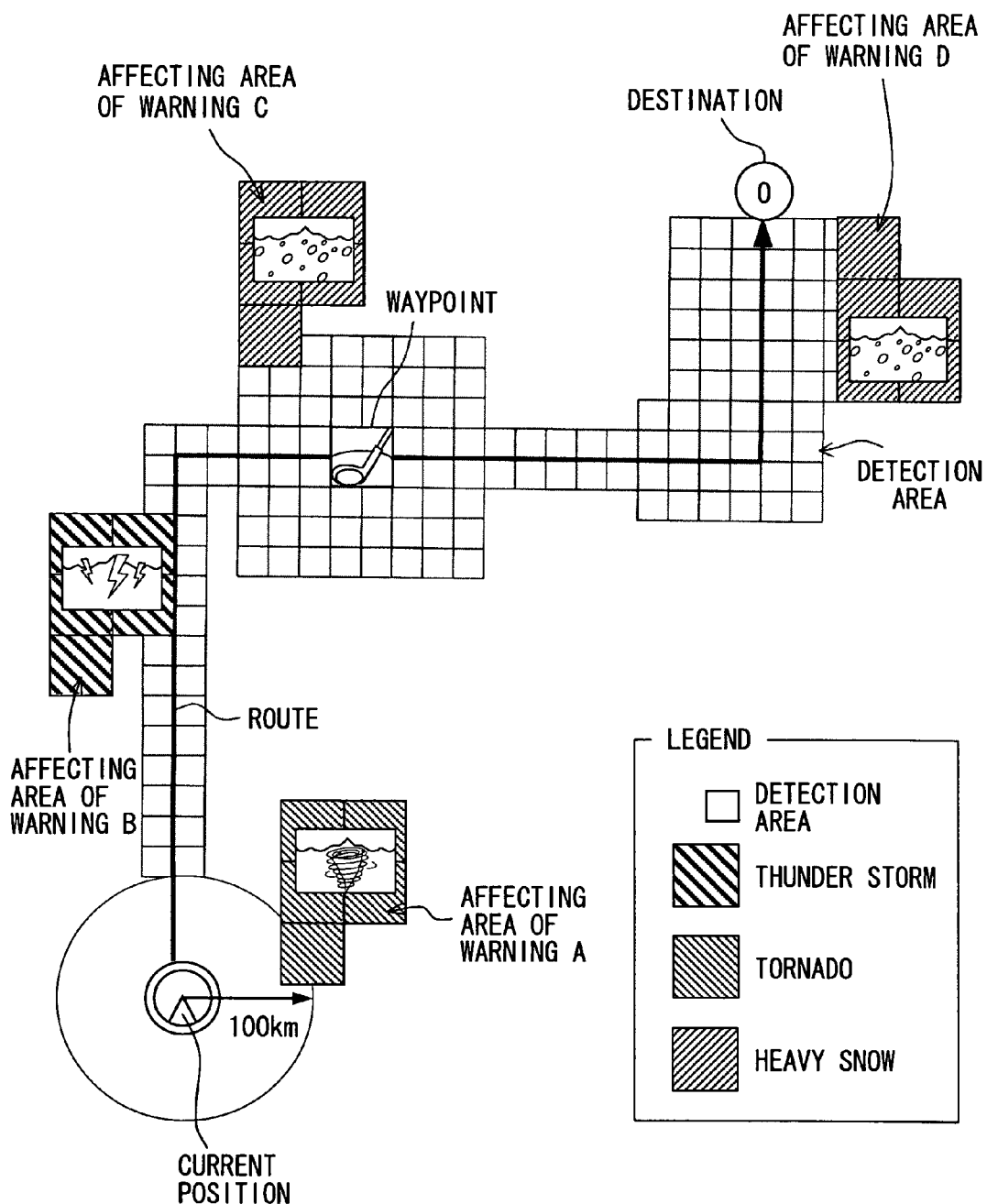
FIG. 11 shows still yet another diagram explaining weather information display processing.

Further, about the parameter (8) "a kind of a waypoint," "the timing of the change of the number of waypoints," or "the timing of route setting (including re-routing)" may be preferably set as the re-determination timing peculiar to the parameter. This parameter has the threshold value of "when a waypoint is a facility of a specific classification" for the detection area change. That is, when the threshold value of detection area change is exceeded, the distance from an arbitrary point to the outer boundary of the detection area is multiplied by a factor of n according to the classification of the facility. For example, as illustrated in FIG. 11, when the waypoint is a long-stay facility such as a theme park, a golf course, etc., the distance from the waypoint to the outer boundary of the detection area is multiplied by a factor of 5. This scheme is adopted because the stay in the "long-stay" facility tends to be extended further than usual. That is, the detection area is expanded to cover the larger area for detecting the weather phenomenon further in advance.

Figure 12:
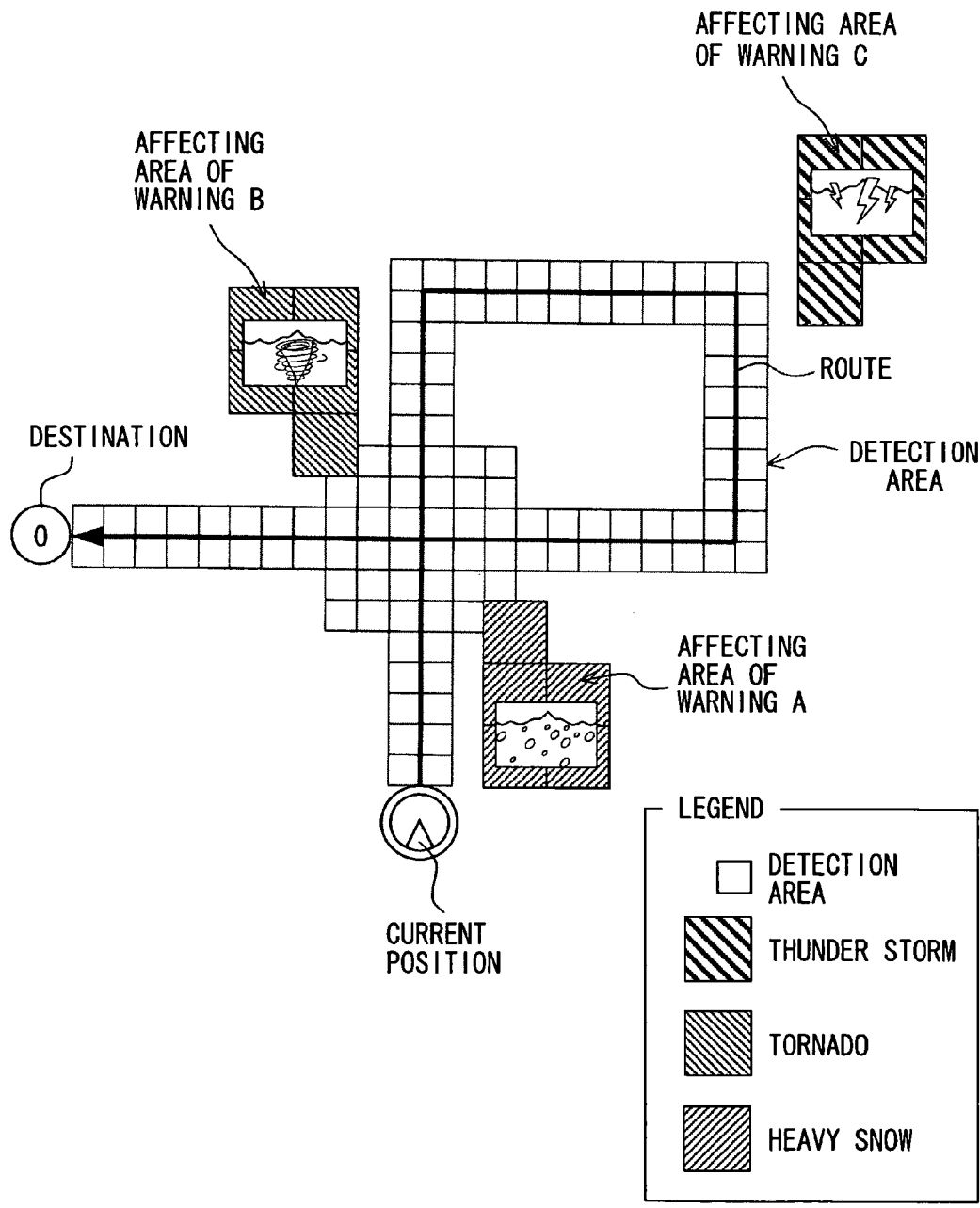
FIG. 12 shows still yet another diagram explaining weather information display processing.

Further, about the parameter (9-1) "a route shape," "the timing of route setting (including re-routing)" may be preferably set as the re-determination timing peculiar to the parameter. This parameter has the threshold value of "the route has a multi-pass point where the vehicle passes at least twice" for the detection area change. That is, when the threshold value of detection area change is exceeded, the distance from the multi-pass point to the outer boundary of the detection area is multiplied by a factor of n. For example, as illustrated in FIG. 12, when the route that passes a start point twice is set, the distance from the start point to the outer boundary of the detection area is multiplied by a factor of 3. This scheme is adopted because the loop shape of the route leads to a fact that the weather phenomenon may affect the travel of the vehicle when the vehicle passes the same point for the second time, which is an important factor in the route determination. Therefore, the detection area is expanded to cover a larger area around the multi-pass point for detecting the possibly affecting weather phenomenon further in advance.

Figure 13A:
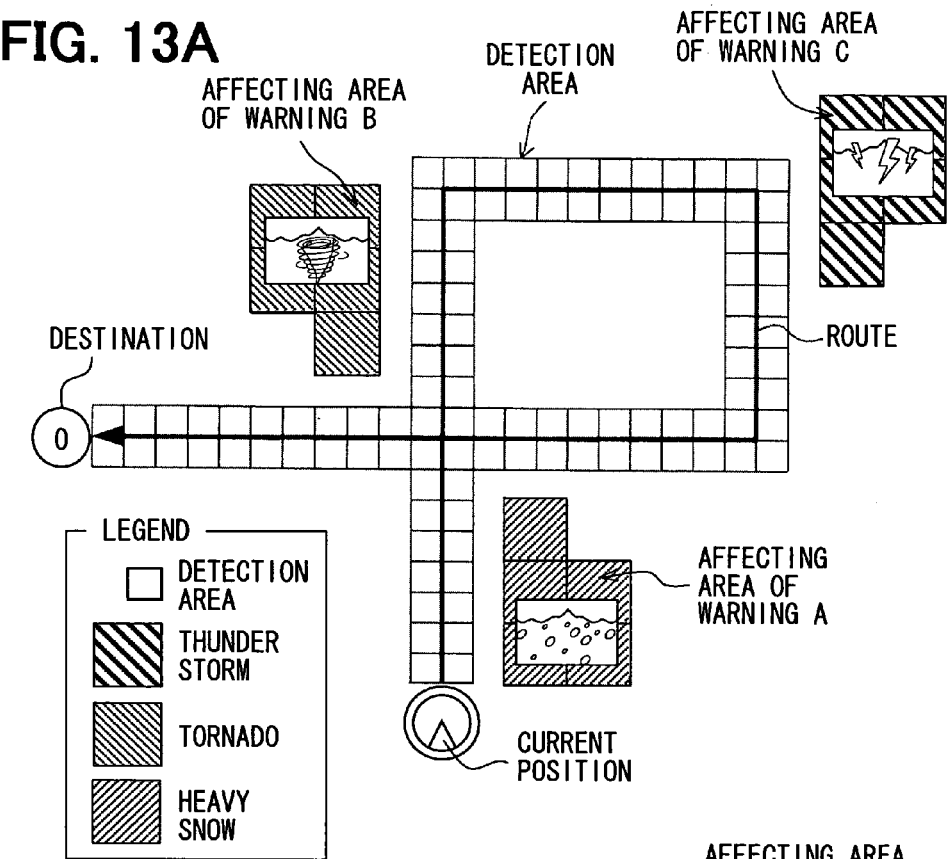
FIGS. 13A/B show still yet two other diagrams explaining weather information display processing.
Figure 13B:
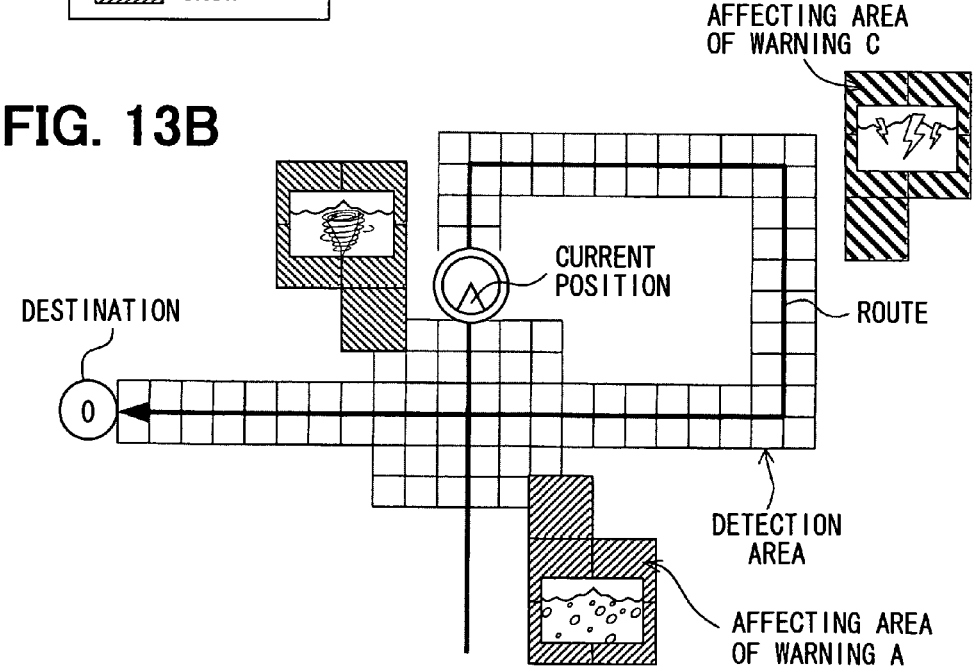

Further, about the parameter (9-2) "a route shape," the multiplication of the multi-pass point to the outer boundary distance by the factor of n may be skipped for the first passing of the multi-pass point (refer to FIGS. 13A/B). In this case, the detection area where distance to the outer boundary is increased by n times is not displayed until the vehicle passes the multi-pass point for the first time (refer to FIG. 13A), and the n time expanded detection area is displayed once the vehicle has passed the multi-pass point for the first time (refer to FIG. 13B).

(3. Explanation of the Advantageous Effects)

(1) According to the navigation apparatus 20 of the present embodiment, the following effects are achieved. That is, in the weather information display processing, the control circuit 29 defines a predetermined range from the travel route as the detection area from among the object routes (S115-S130), and determines whether a weather warning exists in the detection area with reference to the weather information which is acquired by the external communication unit 24 (S135). In being an affirmative determination (S135:YES), the control circuit 29 considers that the influence by the weather phenomenon is expected, and notify a user of the influence (S140). More practically, the control circuit 29 displays the travel route, the detection area, and the affecting area of the weather warning on the display 26. By displaying those information and by setting the detection area, the detection operation of the weather information on the travel route to the destination can be performed in an accurate manner and can be tailored to suit to the actual weather condition of the detection area. Further, the positional relation among the travel route from the current position to the destination, the currently traveling road and the weather phenomenon such as a typhoon or the like is presented in an easily recognizable manner, thereby facilitating an easy prediction of the influence of the weather phenomenon in a future time for the area in the travel direction of the vehicle.

(2) According to the navigation apparatus 20 of the present embodiment, the distance from the arbitrary point to the outer boundary of the detection area is configured to increase in proportion to the distance from the current vehicle position to the arbitrary point in a stepwise manner. In this manner, that is, by increasing the arbitrary point to the outer boundary distance in the stepwise manner, the influence of the weather phenomenon in a future time for the area in the traveling direction can be easily predicted.

(3) According to the navigation apparatus 20 of the present embodiment, the control circuit 29 determines the detection area based on a parameter (S115), and increases/decreases the detection area according to the parameter (S125) when the detection area re-determination timing has arrived (S117: YES) and the threshold value of detection area change is exceeded (S120:YES). Thus, by using the configuration to change the distance to the outer boundary from an arbitrary point according to the classification of the weather phenomenon, the influence of a future weather phenomenon for the area in the travel direction of the vehicle can be predicted more easily.

(4) According to the navigation apparatus 20 of the present embodiment, the detection area is set up to include a predetermined distance from the current position of the vehicle in the weather information display processing. By this configuration, the influence of weather phenomenon which exists around the current position of the vehicle for the area in the traveling direction can be predicted more easily.

(5) According to the navigation apparatus 20 of the present embodiment, the detection area is composed of predetermined sectional units on the map. In addition, the sectional unit is formed as a grid divided by the latitude and longitude. In this manner, the weather information provided for each of the grid areas divided, for example by the latitude and longitude can be accommodated.

(6) According to the navigation apparatus 20 of the present embodiment, the sectional unit for composing the detection area is configured to be smaller than the sectional unit for composing the affecting area of the weather phenomenon. By this configuration, the detection area can be set in a more detailed shape, thereby facilitating the accurate detection of the influence of a future weather phenomenon for the area in the travel direction of the vehicle.

(4. Other Embodiments)

Although the present invention has been fully described in connection with the preferred embodiment thereof with reference to the accompanying drawings, it is to be noted that various changes and modifications will become apparent to those skilled in the art.

(1) In the above embodiment, the arbitrary point to outer boundary distance is increased in a stepwise manner when, for example, the route distance exceeds a predetermined value. However, the distance to the outer boundary may have a constant value from the arbitrary point on the travel route.

(2) Further, the distance to the outer boundary of the detection area from an arbitrary point may be changed smoothly according to the distance from the current position to the arbitrary point on the travel route. The influence of the future weather phenomenon for the area in the travel direction of the vehicle can also be predicted more easily in a manner described above.

(3) Furthermore, the distance to the outer boundary of the detection area from an arbitrary point may be changed according to the travel time to arrive to the arbitrary point. In addition, the smoothing or the stepwise change of the outer boundary distance according to the travel time may be taken into consideration. In this case, the detection area boundary at the arbitrary point on the travel route may have a distance that is in proportion to the travel time to arrive to the arbitrary point. Thus, when the distance to the outer boundary from an arbitrary point is determined according to the travel time to the arbitrary point, the influence of the future weather phenomenon for the area in the travel direction of the vehicle can be predicted more easily.

Figure 6A:
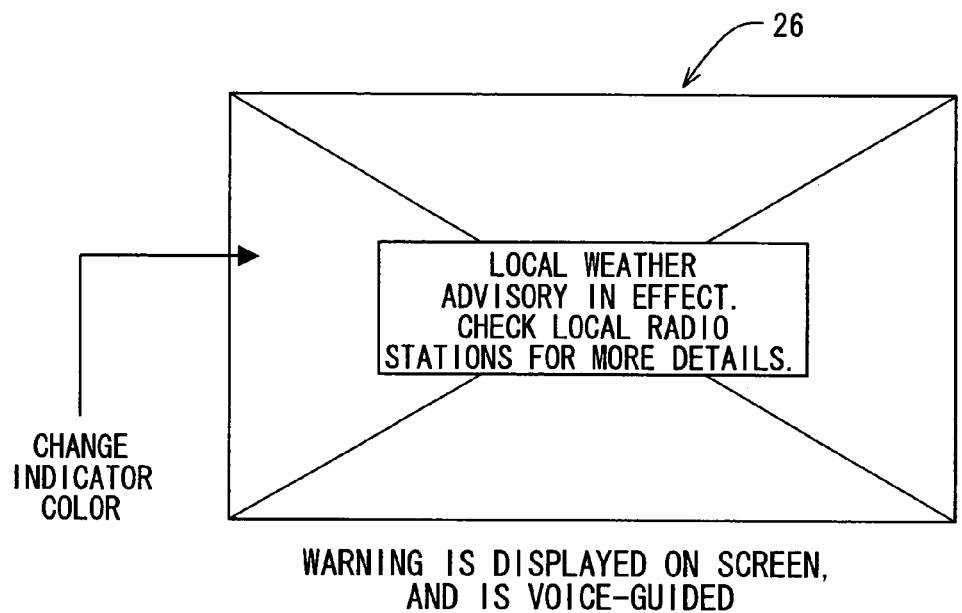
FIG. 6A shows a diagram showing an example display of the weather information.
Figure 6B:
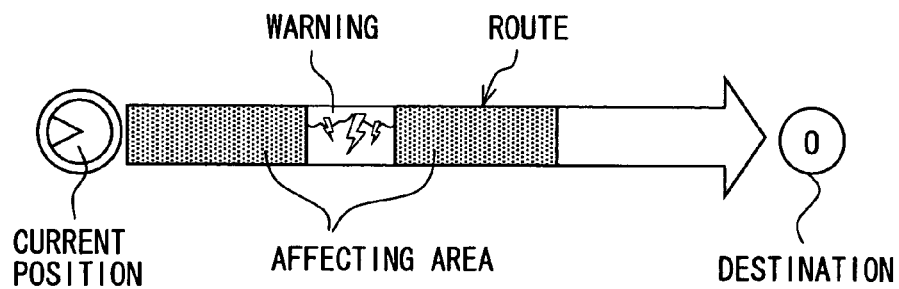
FIG. 6B shows a diagram showing another example display of the weather information.

(4) In the above embodiment, the control circuit 29 displays "the travel route (such as the currently traveling road, the guidance route or the like)," "the detection area," and "the affecting area of the weather phenomenon" on the display 26 (refer to S140 in FIG. 5) when it is determined that a weather warning exists in the detection area (S135:YES) in the weather information display processing. However, as illustrated in FIG. 6A, a fact that a weather warning exists in the detection area may be notified by changing an indicator color on the display 26. Further, as illustrated in FIG. 6A, a fact that a weather warning exists in the detection area may be notified by displaying the weather warning along the travel route that is presented in a simplified form.

Furthermore, as described above, "the travel route (such as the currently traveling road, the guidance route or the like)," "the detection area," and "the affecting areas of the weather phenomenon" may be displayed on the display 26 together with the map display based on the map information.

In this manner, the positional relation among the travel route, the currently traveling road and the weather phenomenon such as a typhoon can also be easily recognized. Therefore, the influence of a future weather phenomenon for the area in the travel direction of the vehicle can be predicted more easily.

Figure 14:
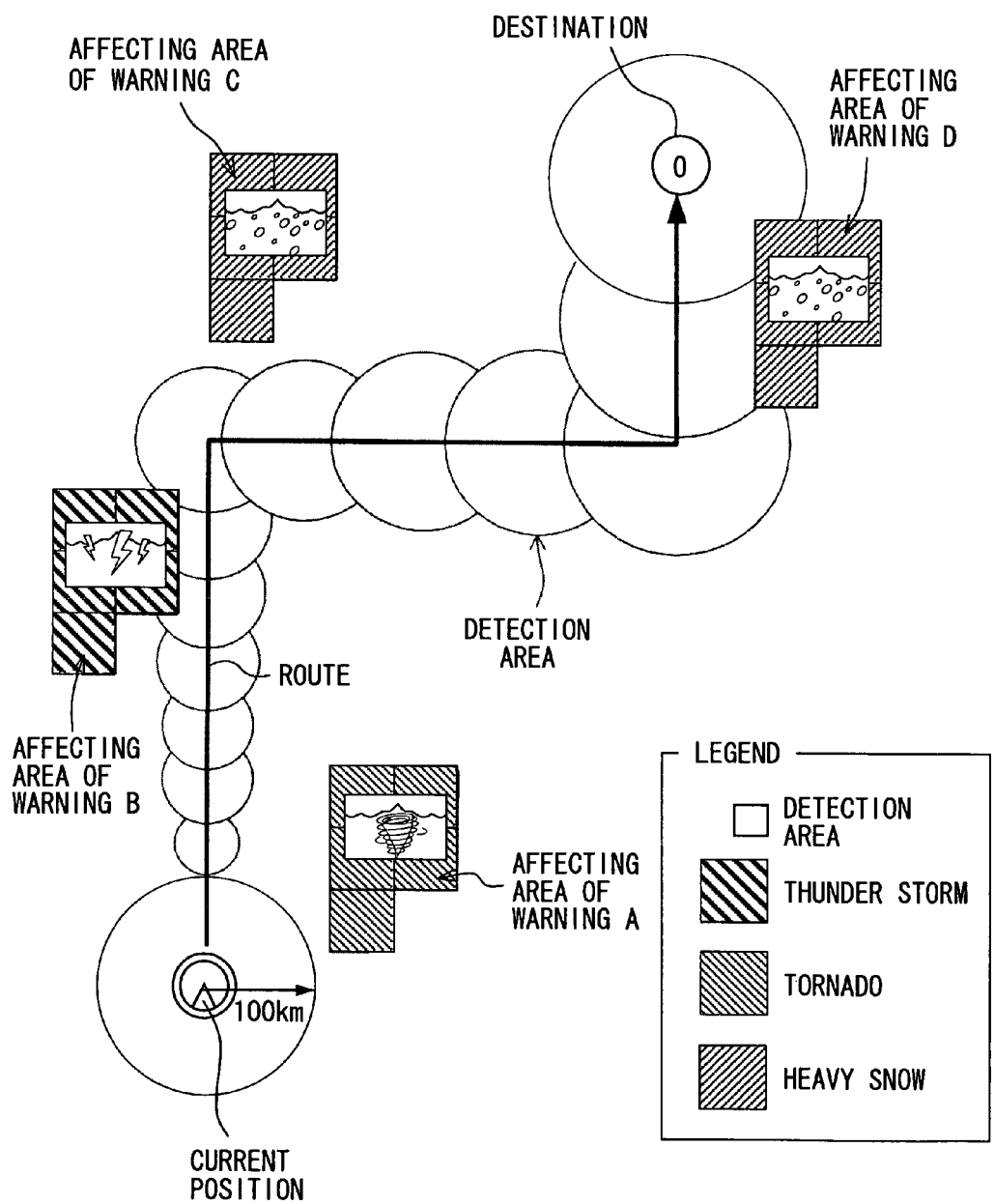
FIG. 14 shows still yet another diagram explaining weather information display processing.

(5) In the above embodiment, the grid area for composing the detection area is divided by the latitude and longitude lines. However, the detection area may be composed by the sectional area of polygonal shape, circular shape or other shapes (refer to FIG. 14).

Such changes and modifications are to be understood as being within the scope of the present invention as defined by the appended claims.

What is claimed is:

1. A navigation apparatus comprising:
   a travel route determination unit for determining a travel route of a vehicle;
   a detection area defining unit for defining a detection area, wherein the detection area is defined as an area that is within a predetermined range from the travel route determined by the travel route determination unit, and wherein whether or not noteworthy weather phenomenon in the detection area affects the vehicle is detected;
   a weather information obtaining unit for obtaining weather information that is set to a first sectional unit on a map; and
   a determination unit for deciding whether or not an affecting area is at least partially existing in the detection area defined by the detection area defining unit with reference to the weather information, wherein the affecting area is made up of the first sectional unit to which the noteworthy weather phenomenon is set, and wherein the determination unit determines that the weather phenomenon corresponding to the affecting area is affecting when the affecting area is at least partially existing in the detection area, wherein
   the detection area defining unit uses the detection area from a second sectional unit on the map,
   the detection area defining unit defines the second sectional unit for composing the detection area as a smaller area than the first sectional unit for composing the affecting area.

2. The navigation apparatus of claim 1, wherein
   the detection area defining unit defines the detection area as an area that includes a predetermined distance from a current position of the vehicle.

3. The navigation apparatus of claim 1, wherein
   the detection area defining unit further defines the second sectional unit for composing the detection area as a grid area divided by longitude and latitude.

4. The navigation apparatus of claim 1, wherein
the detection area defining unit further defines the second sectional unit for composing the detection area as a circular area.

5. The navigation apparatus of claim 1, wherein
the detection area defining unit further defines the second sectional unit for composing the detection area as a polygonal area.

6. A navigation apparatus comprising:
a travel route determination unit for determining a travel route of a vehicle;
a detection area defining unit for defining a detection area, wherein the detection area is defined as an area that is within a predetermined range from the travel route determined by the travel route determination unit, and wherein whether or not noteworthy weather phenomenon in the detection area affects the vehicle is detected;
a weather information obtaining unit for obtaining weather information that is set to a first sectional unit on a map; and
a determination unit for deciding whether or not an affecting area is at least partially existing in the detection area defined by the detection area defining unit with reference to the weather information, wherein the affecting area is made up of the first sectional unit to which the noteworthy weather phenomenon is set, and wherein the determination unit determines that the weather phenomenon corresponding to the affecting area is affecting when the affecting area is at least partially existing in the detection area, wherein
the detection area defining unit defines the detection area in accordance with a distance from the current position of the vehicle,
the detection area is configured to be broader in proportion to the distance from the current position of the vehicle.

7. A navigation apparatus comprising:
a travel route determination unit for determining a travel route of a vehicle;
a detection area defining unit for defining a detection area, wherein the detection area is defined as an area that is within a predetermined range from the travel route determined by the travel route determination unit, and wherein whether or not noteworthy weather phenomenon in the detection area affects the vehicle is detected;
a weather information obtaining unit for obtaining weather information that is set to a first sectional unit on a map; and
a determination unit for deciding whether or not an affecting area is at least partially existing in the detection area defined by the detection area defining unit with reference to the weather information, wherein the affecting area is made up of the first sectional unit to which the noteworthy weather phenomenon is set, and wherein the determination unit determines that the weather phenomenon corresponding to the affecting area is affecting when the affecting area is at least partially existing in the detection area, wherein
the detection area defining unit defines the detection area in accordance with a travel time from the current position of the vehicle,
the detection area is configured to be broader in proportion to the travel time from the current position of the vehicle.

8. A navigation apparatus comprising:
a travel route determination unit for determining a travel route of a vehicle;
a detection area defining unit for defining a detection area, wherein the detection area is defined as an area that is within a predetermined range from the travel route determined by the travel route determination unit, and wherein whether or not noteworthy weather phenomenon in the detection area affects the vehicle is detected;
a weather information obtaining unit for obtaining weather information that is set to a first sectional unit on a map; and
a determination unit for deciding whether or not an affecting area is at least partially existing in the detection area defined by the detection area defining unit with reference to the weather information, wherein the affecting area is made up of the first sectional unit to which the noteworthy weather phenomenon is set, and wherein the determination unit determines that the weather phenomenon corresponding to the affecting area is affecting when the affecting area is at least partially existing in the detection area, wherein
the detection area defining unit defines the detection area that corresponds to a route point on the travel route in accordance with a size of the affecting area of the weather phenomenon,
the detection area that corresponds to the route point on the travel route is modified in accordance with the size of the affecting area of the weather phenomenon.

9. A navigation apparatus comprising:
a travel route determination unit for determining a travel route of a vehicle;
a detection area defining unit for defining a detection area, wherein the detection area is defined as an area that is within a predetermined range from the travel route determined by the travel route determination unit, and wherein whether or not noteworthy weather phenomenon in the detection area affects the vehicle is detected;
a weather information obtaining unit for obtaining weather information that is set to a first sectional unit on a map; and
a determination unit for deciding whether or not an affecting area is at least partially existing in the detection area defined by the detection area defining unit with reference to the weather information, wherein the affecting area is made up of the first sectional unit to which the noteworthy weather phenomenon is set, and wherein the determination unit determines that the weather phenomenon corresponding to the affecting area is affecting when the affecting area is at least partially existing in the detection area, wherein
the detection area defining unit defines the detection area that corresponds to the current position of the vehicle in accordance with a predetermined speed of the vehicle when the vehicle has traveled for a predetermined period at a speed that is equal to or under the predetermined speed,
the detection area that corresponds to the current position of the vehicle is modified in accordance with the predetermined speed of the vehicle when the vehicle has continuously traveled for a predetermined period of time at a speed that is equal to or under the predetermined speed.

10. A navigation apparatus comprising:
a travel route determination unit for determining a travel route of a vehicle;
a detection area defining unit for defining a detection area, wherein the detection area is defined as an area that is within a predetermined range from the travel route determined by the travel route determination unit, and wherein whether or not noteworthy weather phenomenon in the detection area affects the vehicle is detected;

a weather information obtaining unit for obtaining weather information that is set to a first sectional unit on a map; and a determination unit for deciding whether or not an affecting area is at least partially existing in the detection area defined by the detection area defining unit with reference to the weather information, wherein the affecting area is made up of the first sectional unit to which the noteworthy weather phenomenon is set, and wherein the determination unit determines that the weather phenomenon corresponding to the affecting area is affecting when the affecting area is at least partially existing in the detection area, wherein the detection area defining unit defines the detection area that corresponds to the current position of the vehicle in accordance with a speed limit of the current position, the detection area that corresponds to the current position of the vehicle is modified in accordance with the speed limit.

11. A navigation apparatus comprising:

a travel route determination unit for determining a travel route of a vehicle;

a detection area defining unit for defining a detection area, wherein the detection area is defined as an area that is within a predetermined range from the travel route determined by the travel route determination unit, and wherein whether or not noteworthy weather phenomenon in the detection area affects the vehicle is detected;

a weather information obtaining unit for obtaining weather information that is set to a first sectional unit on a map; and a determination unit for deciding whether or not an affecting area is at least partially existing in the detection area defined by the detection area defining unit with reference to the weather information, wherein the affecting area is made up of the first sectional unit to which the noteworthy weather phenomenon is set, and wherein the determination unit determines that the weather phenomenon corresponding to the affecting area is affecting when the affecting area is at least partially existing in the detection area, wherein the detection area defining unit defines the detection area that corresponds to a route point on the travel route in accordance with a type of the weather phenomenon, the detection area that corresponds to the route point on the travel route is modified in accordance with the type of the weather phenomenon.

12. The navigation apparatus of claim 1, wherein
the detection area defining unit defines the detection area as a range that is centered around a waypoint on the travel route when the waypoint exists on the travel route.

13. The navigation apparatus of claim 12, wherein
the detection area defining unit defines the detection area according to a type of the waypoint.

14. The navigation apparatus of claim 1, wherein
the detection area defining unit defines the detection area as a predetermined range that corresponds to a multi-pass point when the travel route having been searched has the multi-pass point that is traveled through at least twice by the vehicle.

15. The navigation apparatus of claim 14, wherein
the detection area defining unit re-defines the detection area that corresponds to the multi-pass point after the vehicle has passed the multi-pass point.

16. The navigation apparatus of claim 1 further comprising:

a display unit for displaying various information for a user;

a control unit for controlling the display unit to display determination information that the weather phenomenon is determined to be affecting by the determination unit when weather phenomenon has the affecting area that is at least partially existing in the detection area.

17. The navigation apparatus of claim 16, wherein
the control unit controls the display unit to display at least the travel route, the detection area and the affecting area as the determination information.

18. The navigation apparatus of claim 16 further comprising:

a map information obtaining unit for obtaining map information, wherein the display unit is capable of displaying the map information obtained by the map information obtaining unit, and the control unit controls the display unit to display the map based on the map information obtained by the map information obtaining unit, and controls the display unit to display the determination unit.

19. The navigation apparatus of claim 1 wherein a program stored in a storage medium of a computer controls the computer to be serving as the detection area defining unit and the determination unit.

20. The navigation apparatus of claim 16 wherein a program stored in a storage medium of a computer controls the computer to be serving as the detection area defining unit, the determination unit and the control unit.

* * * * *